United States Patent [19]

Maccaferri

[11] Patent Number: 4,830,568

[45] Date of Patent: May 16, 1989

[54] APPARATUS FOR HANDLING SPOOLS

[75] Inventor: Angelo Maccaferri, Bologna, Italy

[73] Assignee: S.A.M.P. S.p.A. Meccanica di Precisione, Italy

[21] Appl. No.: 141,264

[22] Filed: Jan. 6, 1988

[30] Foreign Application Priority Data

Jan. 23, 1987 [IT] Italy .............................. 12406 A/87

[51] Int. Cl.$^4$ ............................................. B66C 23/00
[52] U.S. Cl. ..................................... 414/684; 294/93; 294/97; 414/729; 414/910; 414/911
[58] Field of Search ............... 414/729, 744 R, 744 A, 414/910, 911, 684; 294/97, 94

[56] References Cited

U.S. PATENT DOCUMENTS 4,039,365  8/1977  Takasuga et al. ............... 414/910 X
4,728,248  3/1988  Martins .................................. 414/684
4,736,978  4/1988  Cielker ............................... 294/97 X

FOREIGN PATENT DOCUMENTS 1211214  2/1986  U.S.S.R. .............................. 414/910

Primary Examiner—Robert J. Spar
Assistant Examiner—Donald W. Underwood

[57] ABSTRACT

This invention relates to a handling apparatus designed to move on at least two orthogonal axes and, preferably, on three axes, said apparatus being capable of positively gripping spools at their axial bore with great precision and being particularly adapted to be associated with plants designed for automation of the loading and unloading operations of said spools, respectively, into and from wire winding machines and into and from feeding and collecting stations where said spools may be disposed with any orientation.

5 Claims, 4 Drawing Sheets

APPARATUS FOR HANDLING SPOOLS

SUMMARY OF THE INVENTION

The present invention relates to an apparatus for handling spools having an axis with any orientation, capable of operating on the axial bore of said spools and particularly adapted to be associated with plants designed for automation of the loading and unloading operations of the empty and filled spools into and from wire winding machines and into and from feeding and collecting stations for said spools, respectively.

The apparatus comprises a vertical turret adapted to rotate about its axis and having pivotably connected thereto an end of a horizontal arm that may be oscillated by suitable means such as, for example, a hydraulic jack. A "forearm" is mounted orthogonally on said arm, preferably with the intermediary of means capable of rotating said forearm about the axis of said arm, whereby said forearm may be given any orientation about the round angle. Telescoped in the forearm is a rod which may be axially slid by suitable means, which carries at an end thereof an expansion spike, and which mounts an axially movable centering cone arranged, at rest, adjacent the forearm and the taper of which faces said spike. Said rod will be inserted throughout the axial bore of a spool, so that said spool will be clamped thereby on said rod and will be aligned axially on said rod due to the effect of the centering and clamping actions of both said spike and cone.

At due time, said arm is raised and said turret is rotated about its axis and then, with suitable movements of the means according to the invention, the spool is positioned and discharged onto the desired area and with the desired orientation.

The apparatus of the invention may be fixedly mounted in proximity of one or more operative stations for exclusively serving them and the units of co-operating therewith, or it may be mounted either alone or with other devices on a powered carriage, to be transferred, when required, to the operative stations to be served.

BRIEF DESCRIPTION OF THE DRAWINGS

Further characteristics of the apparatus according to the invention, and the advantages resulting therefrom, will be apparent from the following description of a preferred embodiment thereof, given merely by way of a non-limiting example in the figures of the accompanying three sheets of drawings, wherein.

DESCRIPTION OF THE PREFERRED EMBODIMENTS

Figure 1:
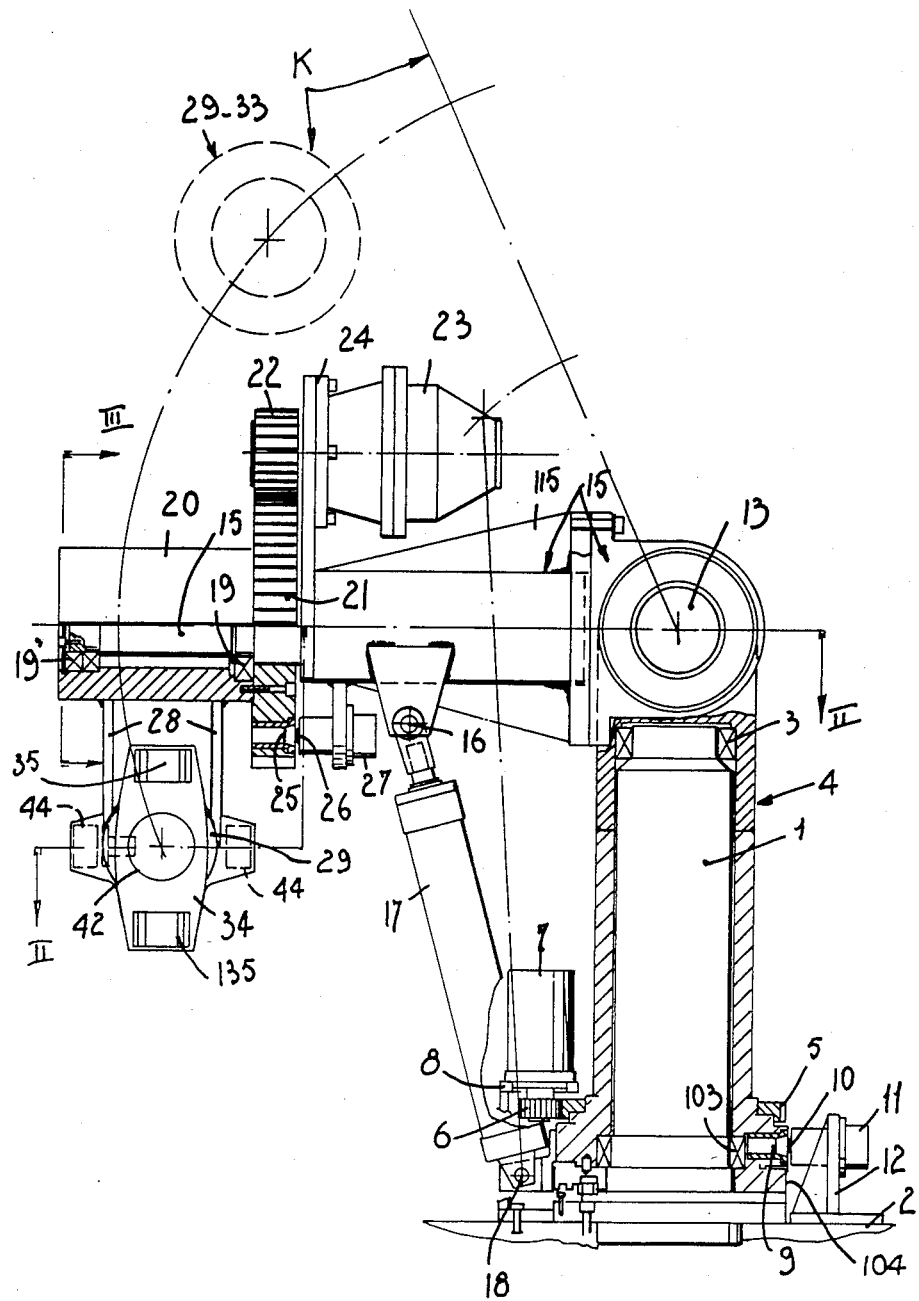
FIG. 1 is a side elevational and partly sectional view of the apparatus according to the invention.

With reference to the figures, the apparatus comprises a vertical column 1 secured to a suitable supporting structure 2 to be discussed below. The column 1 rotatably mounts, through the intermediary of bearings 3–103, a turret 4 having keyed to its lower end portion a co-axial toothed ring 5 meshing with a pinion 6 of a small hydraulic motor 7 which, in turn, is secured to a support member 8 integral with said supporting frame structure 2. The lower end portion of said turret 4 is formed with an enlarged portion 104 provided radially to said column with partly-conical seats 9 which, under command, may be engaged by a plug member 10 activated by a jack 11 which is mounted on a supporting member 12 integral with the frame 2. The plug member 10 will lock the turret 4 in the angular position to which said turret has been moved by the motor 7, the latter being activated with variable motion by conventional means.

The top of the turret 4 mounts a horizontal shaft 13 pivotably supporting, through bearings 14–114, and end of an arm 15. Pivoted intermediately to the arm 15, as shown at 16, is the stem of a hydraulic jack 17 the body of which is pivoted at 18 to the frame 2. By the action of the jack 17, said arm 15 may be either positioned horizontally or lifted as far as to the limit position indicated with K in FIG. 1.

Co-axially and rotatably mounted at the end of the arm 15, through the intermediary of bearings 19—19', is a bushing 20 having co-axially keyed thereon a toothed gear ring 21 meshing with the pinion 22 of a hydraulic motor 23 which is secured to a plate 24 integral with the arm 15. Fixed to the body of said gear ring 21, parallelly to and equally spaced from the axis thereof, are partly conical seats 25 which, under command, may be engaged by a plug member 26 activated by a jack 27 which is suitably secured to the arm 15. By these provisions, the rotation of said bushing 20 may be locked at the desired points of the round angle, to which it is moved by the actuation of the motor 23, the latter being actuated with variable motion, similarly to the motor 7. Both motors are controlled by stop valves for the slipping-away loads, which is particularly required for the motor 23 which, for this purpose, might be associated with a non-reversible speed reducer, for example, of the worm gear type.

In the accompanying drawings, the numerals 115 designate longitudinal ribs or gussets intended to increase the resistance of the arm 15 to bending stresses.

Figure 3:
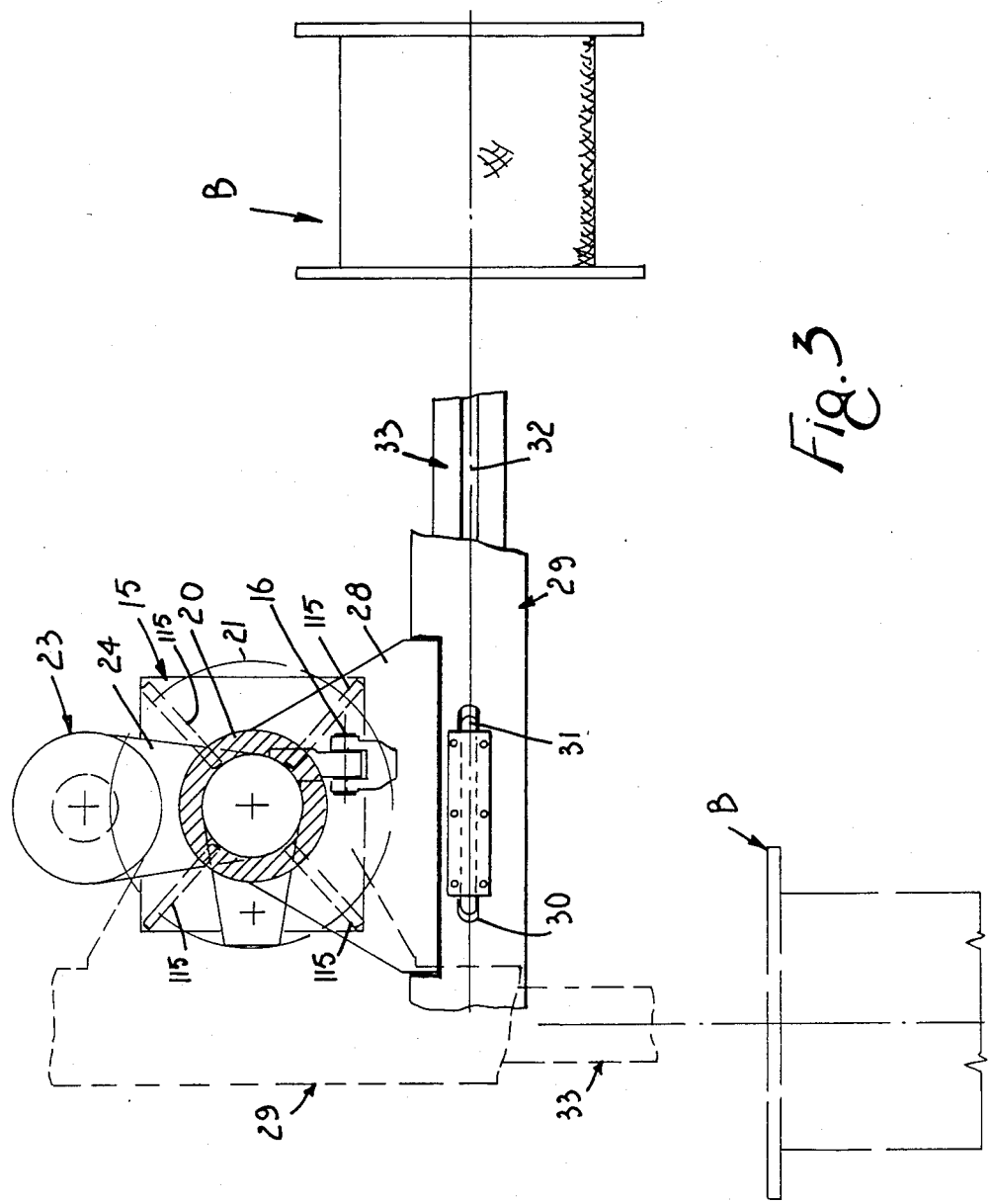
FIG. 3 is a sectional view on the line III—III of FIG. 1, showing further constructional and operational details of the apparatus.
Figure 4:
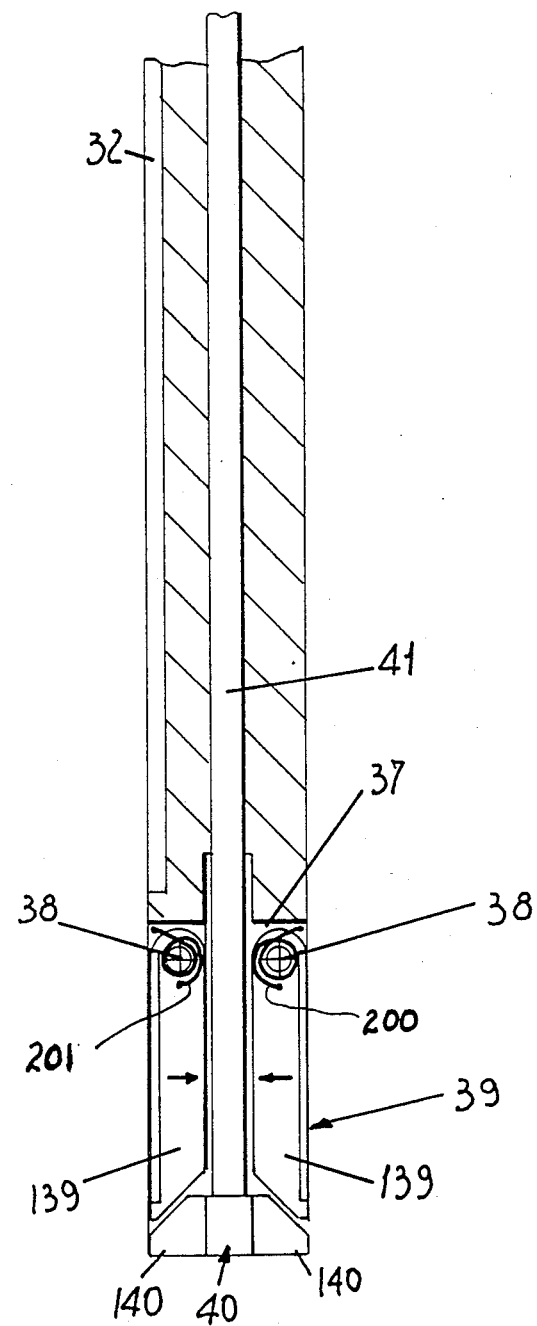
FIG. 4 is a partial view, on enlarged scale, of spike 39 in FIG. 2.

Secured normally to the bushing 20 are two similar plates 28 having the configuration of an isosceles trapezium as shown in FIG. 3, the longer side of each said trapezium being welded substantially tangentially to a tubular forearm 29 which is perpendicular to the arm 15 and is provided with a longitudinal slot 30 traversed by a key 31 which is secured to the outside of said forearm by means of a base member 131 and co-operating as a guide with a longitudinal keyway 32 formed in a rod 33 which is axially slidable within said forearm with the intermediary of bearing 50-150 of low-friction material.

Figure 2:
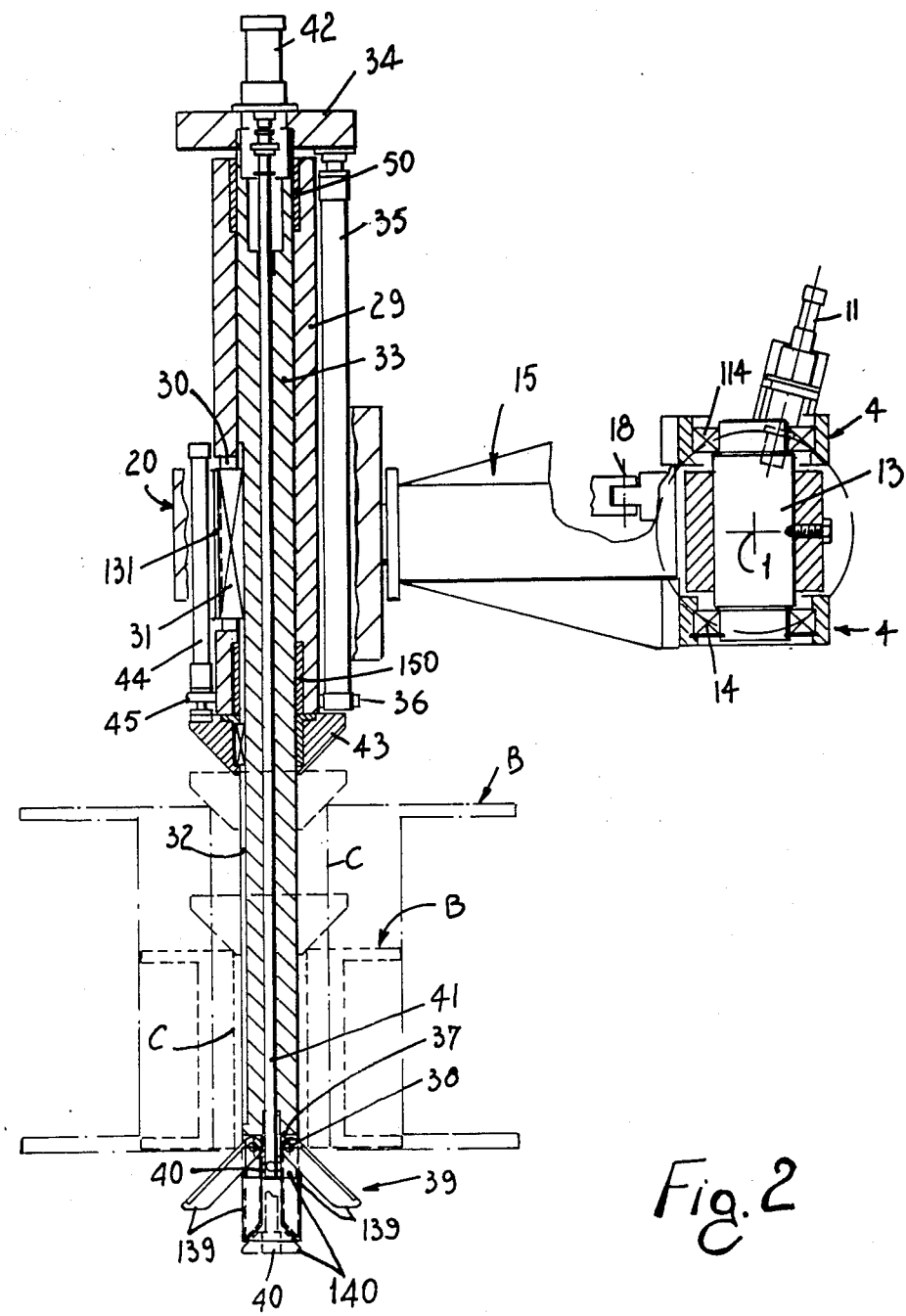
FIG. 2 is a sectional view on the line II—II of FIG. 1, showing further constructional details.

Secured normally to an end of the rod 33 is a baseplate 34 shaped as shown on the FIGS. 1 and 2 and having affixed thereto, at two diametrically opposite points with respect to the forearm 29, the stems of two similar jacks 35-135, arranged parallelly to said forearm and secured thereto with their bodies, for example, as indicated at 36 in FIG. 2. These jacks are of the double-acting type, so as to cause the displacement of the rod 33 in both directions.

At the end opposite from the baseplate 34, the rod 33 is formed with at least three longitudinal slots 37 which are equally spaced apart angularly. Pivoted at an end thereof in said slots, as shown at 38, normally to the axis of said rod 33, are respective straight and identical jaws or barbs 139 which are urged by springs 200–201 (FIG.

4) or any other suitable resilient means against respective shoulders 140 which are slidable within said slots 37 and are secured to a common member 40 which, in turn, is secured to an end of a stem 41 axially movable within the rod 33 and connected at the other end thereof to an actuating double-acting jack 42 the body of which is secured to said baseplate 34. As a result of the activation of said stem 41, the member 40 is moved from the position shown with solid lines to the position shown with dotted lines in FIG. 2, or vice versa, with resulting bunching together or spreading apart of the jaws 139 of the spike 39, as shown with dotted lines and with solid lines in FIG. 2.

The apparatus of the invention comprises, finally, a conical slider 43 which is slidably mounted on the portion of the rod 33 that protrudes from the forearm 29 and carries the spike 39, the taper of the conical slider 43 being directed toward said spike. The slider 43 in connected to the stem of one or more jacks 44 which are parallel to the forearm 29 and are secured with their bodies to said forearm at 45. When the apparatus is at rest, the conical slider 43 is in the position shown with solid lines in FIG. 2, substantially abutting against the forearm 29, while the rod 33 is completely retracted so that said jaws or barbs 139 of the spike 39, bunched together and, therefore, in their most compacted condition, are closely spaced from said conical slider 43.

The operation of the apparatus described above is simple and readily apparent.

By acting on the various articulation and rotation points, through a pre-established and automatic program of movements, the rod 33 is axially aligned with the axial bore C of a spool B which, as shown in FIG. 3, may be arranged immaterially with its axis either horizontally or vertically, and so that said bore C is free from any hindrance. If the spool is arrnged with its axis in a vertical condition, it rests with its lower flange on a support leaving the lower end of said axial bore C completely open and unobstructed.

After said aligning operation—that in combination with or alternatively to what stated above may be effected by a suitable displacement of the spool with respect to the apparatus of the invention, pre-arranged with its rod 33 in the desired initial position—said rod 33 is extended and inserted into the axial bore of the spool until the end portion provided with the jaws or barbs 139 will protrude out therefrom. Thereafter, said member 40 is retracted and the jaws 139 will be spread apart centripetally until they contact the edge of the adjacent end of the axial bore of said spool, as a result of the previous suitable insertion of said rod 33 throughout said bore. Alternatively, said jaws 139, even spread apart completely, might not contact the spool B, and the contact might be obtained successively by suitably retracting the rod 33.

Thereafter, the conical slider 43 is moved to engage the other end of the axial bore C of said spool, which is thus firmly clamped on the rod 33 and its axis is perfectly aligned therewith. Suitable sensors, for example of the pressure-responsive type, detect the limit conditions of said jaws and conical slider. These sensors, together with the other components of the electrical and fluid circuits for control and detection of the apparatus of the invention, are not shown in the accompanying drawings in that they may be easily conceived and constructed by those skilled in the art.

When the spool has been clamped, the arm 15 is raised to the position K by the jack 17 and the turret 4 is rotated about its vertical axis to a pre-established position after which, through movements opposite to those described previously or through any other suitable movements, said spool is laid down onto the desired spot and is left free from the jaws 139, cone 43 and rod 33. Also in this discharge step, the axis of the spool may be oriented immaterially at any angle to the horizontal and the vertical.

It is to be understood that many changes and modifications, especially of constructional nature, may be made to the apparatus described above. For example, the jack 17 may be replaced by any other driving means for oscillating the arm 15.

If the apparatus is intended to pick up and to discharge spools the axes of which are arranged only horizontally or only vertically, the forearm 29 may be fixedly secured to the arm 15 without any interposed rotation means 19–27 described above.

The apparatus of the invention may be installed stationarily near one or more operative stations in order to exclusively serve these stations or other stations suitably approaching thereto. Alternatively, said apparatus may be mounted, either alone or together with other operative units, on a powered carriage so as to be transferred each time to a different spot for utilization.

I claim:

1. An apparatus for handling either empty and filled spools (B) formed with an axial bore (C), characterized in that it comprises a vertical turret (4) rotatably mounted on a frame structure (1–2) and that by the action of motivating means (5-6-7) and control means (9-10-11) may be rotated about its own axis and having pivoted thereto at its top, on a horizontal shaft (13), and arm (15) which by the action of motivating means (17) may be oriented in different directions depending upon the requirements, the free end of said arm mounting co-axially therewith a bushing (20) which by the action of motivating means (21 to 23) and control means (25 to 27) may assume various orientations in the round angle so as to modify the orientation of a forearm (29) which is secured to said bushing orthogonally to said arm and which telescopically mounts a rod (33) which may be either extended or retracted by suitable actuating means (35), one end of said rod mounting an expansion spike (39) actuated by suitable means (42) and mounting as well a conical slider (43) usually arranged adjacent the forearm and oriented with the taper thereof facing toward said spike, said conical slider being axially displaceable when required, the arrangement being such that said rod with the spike in its retracted condition may be introduced throughout the axial cavity of a spool arranged anyway with its axis, whereafter said spike is expanded and said conical slider is approached to the spool while the spike-carrying rod may be suitably retracted, so that said spool will be firmly clamped between the spike and the cone and, therefore, will be disposed co-axially with said rod (33), whereafter the assembly arm/forearm is lifted and is then rotated about the vertical axis of said turret, after which by means of appropriate movements of the components of said apparatus, said spool is laid down onto the desired spot with its axis disposed either horizontally or vertically as required.

2. An apparatus according to claim 1, characterized in that the rod (33) for picking up the spool comprises, at the end opposite from that provided with the expansion spike (39), a baseplate (34) having connected thereto the stems of respective jacks (35) arranged parallelly to said rod and secured with their bodies to said forearm (29), said forearm having connected thereto as well the bodies of the jacks (44) for axially moving the centering cone (43) longitudinally along said rod (33).

3. An apparatus according to claim 2, characterized in that said spike (39) comprises jaws or barbs (139) which are urged by resilient means against a cam (40) which is keyed to the end of a stem (41) which is axially movable in the rod (33) for picking up the spools and is connected at the other end thereof to a small jack (42) the body of which is fixed to the baseplate (34) having connected thereto as well the jacks (35) for axially moving said rod (33).

4. An apparatus according to claim 1, characterized in that it comprises safety devices of the plug type (10-26) to lock the various components of the apparatus in the various positions to which they are moved each time by the respective acuating means, said safety devices including said control means (25 to 27).

5. An apparatus according to claim 1, characterized in that said spike (39) comprises jaws or barbs (139) which are urged by resilient means against a cam (40) which is keyed to the end of a stem (41) which is axially movable in the rod (33) for picking up the spools and is connected at the other end thereof to a small jack (42) the body of which is fixed to a baseplate (34) having connected thereto as well said actuating means (35) for axially moving said rod (33).

* * * * *